Patented Dec. 27, 1938

2,141,708

UNITED STATES PATENT OFFICE 2,141,708

METHOD OF LAYING WOOD FLOORING

Armin Elmendorf, Winnetka, Ill.

No Drawing. Application February 25, 1937,
Serial No. 127,761

4 Claims. (Cl. 20—6)

In my prior Patent No. 2,045,382, there is disclosed a flexible wood flooring which may be manufactured in panels of any desired size and be glued or cemented upon a concrete or other subfloor. It is important that the joint between the wood flooring and the subfloor be a very good one so that there will be no loose areas initially or after long use. Also, in laying the flooring, the adhesive material should be dry so as to avoid trapping moisture between the subfloor and the overlying flooring.

It is of vital importance to obtain closed joints between meeting sheets or panels in order that the joints between panels shall not differ in appearance from those within the borders of a panel, if a fine floor is desired. This can be achieved only by employing a bonding material which will permit a panel to be slid over the subfloor, in laying, and may be caused instantly to prevent displacement of the panel or creeping of a part of the same that may have been stretched. Adhesives having rubber- or rubber latex for a base possess qualities which are highly desirable in a bond between a flooring and a subfloor. However, unless, such adhesives are wet at the time of laying the flooring, they have a "grabbing" effect and make it impossible to slide a panel from the first position in which it may be laid on the subfloor. Also, if the flooring must be distorted to close a joint or to press it down into a low spot in the subfloor, after being brought in contact with the latter, the wet adhesives cannot hold the flooring material from springing back and thus open joints or lift depressed portions into their normal planes.

The object of the present invention is to make it possible to lay wood flooring upon a subfloor or foundation in such a manner that individual flooring units may be put down without trapping moisture between the wood flooring and the subfloor; be capable of being shifted about in order accurately to locate them, in much the same manner as though there were no adhesive present; and be caused to be firmly held against the tendency to open joints or lift out of hollows, where portions of the flooring panels must be placed under tension to produce closed joints and follow the contour of the subfloor.

An adhesive having as its base an aqueous dispersion of colloidal rubber latex may be spread upon both of two surfaces to be joined and be allowed to dry before bringing such surfaces into engagement with each other; thereby avoiding the trapping of moisture between such surfaces. However, such dry coatings still have such an affinity for each other that if a piece of wood flooring material, for example, coated in this manner, is laid upon a subfloor, likewise coated, they adhere to each other. In that case, if the flooring was not laid down in exactly the right spot in the first instance, it cannot be slid into its proper place. And, if a panel is pulled over to close an open joint, it is drawn back by the rubber bond as soon as the panel is released.

It is known that the addition of a so-called protective agent to a rubber latex adhesive overcomes its tendency to coagulate when other materials are mixed therewith or when the adhesive is subjected to other influences that bring about coagulation as, for example, mere scraping. Usually, only very small quantities of a protective agent are employed. I have found that when a protective agent is present in larger quantities, the capacity of the adhesive to effect a bond upon contact and with the application of only a slight pressure, namely, its "grabbiness", diminishes. If there be present a protective agent in an amount equal to about three percent of the weight of the rubber, two dry coatings of the adhesive may be engaged with each other without adhering. In other words, the "grabbiness" of the adhesive is so modified that if a sheet or panel of flooring material be laid on a subfloor, both having thereon dry coatings of adhesive, or if a wall board be placed against a wall, both being similarly coated, the panel or wall board may be slid about in the plane thereof without causing the engaged coatings to unite, until a definite pressure is applied. If the amount of the protective agent is increased to above twenty percent of the weight of the rubber, the inertness of the adhesive may become so great that a bond can be made, if at all, only with the greatest difficulty. I therefore add to the rubber latex adhesive a protective agent in an amount varying from about three percent to about twenty percent of the rubber content; a good working range being from five percent to ten percent. Then, when a subfloor and a flooring panel are coated with the adhesive and the latter is allowed to dry, the panel may be dropped, coated side down, on the subfloor, without sticking to the latter. Consequently, the workman is able to shift the panel around and press it into edge contact with meeting panels before any bonding occurs. Then, after the panel has been properly located, sharp blows thereon with a rubber hammer, for example, bring about an instant union between the two coatings. It is impossible in commercial practice to be certain that the edge of a panel is perfectly straight and, therefore, when two panels are engaged edge to edge, there may be gaps in the joints. If it be attempted to apply the panels with wet glue, these gaps will re-open even if sufficient pressure is applied to distort one of the panels to close the joint. This follows from the fact that the wet glue does not have sufficient strength to resist the tendency of the distorted panel to spring back into its normal state. The same is true where there are hollows in the subfloor into which the panel must be pressed; wet glue being unequal to the task of holding the depressed portions of the flooring material down. While ordinary dry coatings have the necessary bonding effect to prevent the opening of gaps or the lifting of the flooring material under the conditions just mentioned, these coatings make it almost impossible in the first instance to close the gaps that may occur naturally between the meeting edges of panels, because a panel is bonded to the subfloor in the very position in which it is first laid down. Where my improved bonding material is used, however, the dry coatings do not interfere with the making of the most satisfactory adjustment of a panel, while, at the same time, it requires only a few hammer blows along the marginal portion of a panel to fasten that portion permanently to the subfloor without leaving any possibility for the joint to open.

What has just been said with respect to the laying of flooring material applies also, of course, to the application of wall boards or other panels to walls, ceilings, or other surfaces.

As a protective agent, there may be employed casein or other glues, gelatin, or starches such as sago, tapioca and cornstarches. These protective agents are preferably in solution or in colloidal form when added to the adhesive.

To a mixture of an aqueous dispersion of colloidal latex and the protective agent I add a vulcanizing agent and an accelerator and preferably an anti-oxidant. As soon as the mixture of the various ingredients has been completed, vulcanization begins, and if the adhesive is not used within a comparatively short time, say a few days, it becomes valueless. It thus becomes necessary to prepare the adhesive just before it is required. The preparation can be so far carried out beforehand, however, that no skill or experience is required in the final step needed to place the adhesive in condition for use. To this end I initially prepare two separate mixtures or batches, the first of which contains the latex and the casein or the like, while the other contains all of the remaining ingredients. These mixtures may be properly compounded and be suitably packaged for commercial distribution, so that a user need only mix together the contents of two different packages to make the adhesive ready for use.

The subfloor having been properly prepared and the adhesive mixture completed, both the subfloor and the under side of the wood flooring are coated with the liquid adhesive and are allowed to dry. In the case of adhesive compounded in accordance with my preferred formula, it is desirable that the flooring be laid immediately after the adhesive has become dry. At that time vulcanization has already begun and the adhesive gradually becomes inert so that, if the bonding be delayed for a week, for example, the coatings may be too inert to unite satisfactorily with each other without being first revitalized. Should the bonding be delayed too long, the coatings may be reactivated by washing them over with certain solvents, such as carbon tetrachloride; but if the delay is prolonged still further, even this treatment will not help. At any rate, when a wood flooring unit is laid on a subfloor, or a panel or wall board against a wall, within a few hours after the coatings have dried, the workman encounters no difficulty in fitting one unit or piece against another or in thereafter producing a satisfactory bond through the application of heavy pressure upon the same.

A considerable latitude is of course permitted in formulating the mixture which is to be added to the adhesive proper. I may say, however, that the following formula has been found, in actual practice to give excellent results, the percentages being based on the dry rubber content of the final adhesive:

(1) Colloidal sulphur, from ½% to 2%;
(2) An accelerator in the form of organic "Butyl Zimate", about 1%;
(3) Zinc oxide, about 1% to 2%;
(4) An anti-oxidant, such as "Age-Rite White", about 1%;
(5) Metallic tellurium in dispersed form, a commercial form of which is known as "Telloy", about ½% to 1%.

The sulphur acts as a vulcanizer, and the "Telloy" improves the aging of the adhesive. The use of "Telloy" is not essential, however. The accelerator named induces rapid vulcanization at a low temperature, namely room temperature. The zinc oxide serves to activate the accelerator and make it more effective than would otherwise be the case. The anti-oxidant retards oxidation of the rubber.

A further effect produced by the vulcanizers is to insure that a dry coating of the adhesive shall be free from tackiness. This is due to the fact that vulcanization starts as soon as the first adhesive mixture is completed and continues until the bonding layer becomes fully vulcanized. It is for this reason that the final mixture of the adhesive composition cannot be made except shortly before it is to be used and that the flooring must be laid within a comparatively short time, namely a few hours, after the coatings have dried.

My improved method of bonding panels to surfaces of supporting members permits adjacent panels to be easily positioned so as to bring their outer faces in a common plane instead of allowing the face of one panel to project above or outwardly from the face of an adjacent panel; whereby a smooth floor surface or wall face may readily be obtained. This is because the bonding layer is very thin and need not be caused to flow in the laying of a panel, so that if the surface to which the panels are to be applied is smooth as, for example, a concrete floor covered with felt glued thereto, a uniform pressure applied to all of the panels must inevitably result in accurate registration of their exposed faces with each other.

I claim:

1. The method of securing a wood flooring to a foundation, which consists in coating the upper surface of the foundation and the under surface of the wood with rubber latex in the form of a colloidal dispersion mixed with material that reduces the "grabbiness" of the latex to a point where two dry coatings thereof will not adhere to each other except under heavy pressure and other material that causes vulcanization of the latex at such a rate at room temperature that the latex becomes too inert a few days after the mixture is made to be a satisfactory adhesive, allowing the coatings to dry, laying the flooring on the foundation within a few hours after preparing the adhesive mixture, and applying heavy pressure upon the flooring to unite the coatings.

2. The method of securing a panel to a foundation which consists in coating the upper surface of the foundation and the under surface of the panel with rubber latex in the form of a colloidal dispersion freshly mixed with material that reduces the "grabbiness" of the latex to a point where two coatings will not adhere to each other except under heavy pressure and other material that causes vulcanization of the rubber at room temperature and progressively increases the inertness of the rubber, allowing the coatings to dry, laying the panel on the foundation within a few hours after creating the adhesive mixture, and applying heavy pressure upon the panel to unite the coatings.

3. The method of securing a panel and a foundation which consists in preparing a batch of adhesive composed mainly of a colloidal dispersion of rubber latex and a quantity of a protective agent equalling from three percent to twenty percent of the weight of the rubber, preparing a solution or a dispersion of substances that will cause vulcanization of the latex at room temperature and render the rubber inert in a few days, making a mixture of the two batches and coating both the foundation and one side of the panel with said mixture, allowing the coatings to dry, laying the panel against the foundation within a day after the making of the mixture, and forcing the panel against the foundation under heavy pressure.

4. The method of securing a panel and a foundation which consists in preparing an adhesive composed mainly of a colloidal dispersion of rubber latex and a quantity of a protective agent equalling from three percent to twenty percent of the weight of the rubber and substances that will cause vulcanization of the latex at room temperature and render the rubber inert within a few days, coating both the foundation and one side of the panel with said mixture, allowing the coatings to dry, laying the panel against the foundation within a day after the making of the mixture, and forcing the panel against the foundation under heavy pressure.

ARMIN ELMENDORF.